United States Patent [19]

Schaffer et al.

[11] 3,832,433
[45] Aug. 27, 1974

[54] METHOD OF MAKING PLASTIC COMPOSITE WITH WIRE REINFORCEMENTS

[75] Inventors: Howard E. Schaffer, Allentown; Craig L. Bomboy, Coopersburg, both of Pa.

[73] Assignee: Bethlehem Steel Corporation, Bethlehem, Pa.

[22] Filed: Aug. 28, 1972

[21] Appl. No.: 284,197

[52] U.S. Cl.............. 264/143, 156/62.2, 156/244
[51] Int. Cl............................................ B02c 18/00
[58] Field of Search ......... 156/62.2, 62.4, 148, 180, 156/244, 245; 264/103, 143, 174, 111, 126, 128, 141, 148; 29/195 P, 419, 527.2

[56] References Cited
UNITED STATES PATENTS

| | | | |
|---|---|---|---|
| 2,636,257 | 4/1953 | Ford................................ | 29/195 P |
| 2,817,618 | 12/1957 | Hahn................................ | 156/322 |
| 3,184,368 | 5/1965 | Juras................................ | 161/170 |
| 3,231,341 | 1/1966 | Sump et al....................... | 117/128.4 |
| 3,503,823 | 3/1970 | Richart et al..................... | 156/244 |
| 3,577,494 | 5/1971 | Chisholm et al.................. | 264/143 |
| 3,582,456 | 6/1971 | Stolki.............................. | 161/170 |
| 3,632,366 | 12/1968 | Hiraga.............................. | 264/143 |
| 3,687,798 | 8/1972 | Humphries........................ | 161/156 |

Primary Examiner—Daniel J. Fritsch
Attorney, Agent, or Firm—Joseph J. O'Keefe; Charles A. Wilkinson

[57] ABSTRACT

A wire fiber reinforced plastic composite is formed by coating thin ferrous wires and sacrificial metal wires such as zinc wires in the form of steel and zinc wool or the like with a film of fused acrylonitrile-butadiene-sytrene subsequent to thorough cleaning of the wires. The ferrous and zinc wires are then combined together into a metallic fiber, extrusion coated with a styrene base plastic resin such as polystyrene or acrylonitrile-butadiene-styrene and then chopped into uniform pellets for use as a feed material for a plastic composite hot forming operation preferably heated by induction heating of the component ferrous wires in the plastic. Alternatively the ferrous and zinc fibers can be extrusion coated separately and then blended together as pellets or even used separately for making a plastic composite.

13 Claims, 4 Drawing Figures

FIG. 4

METHOD OF MAKING PLASTIC COMPOSITE WITH WIRE REINFORCEMENTS

CROSS-REFERENCES TO RELATED APPLICATIONS

This application is directed to a method of making a "Plastic Composite with Wire Reinforcement" which is the subject of an application Ser. No. 284,196 being filed concurrently herewith by Darral V. Humphries, which Humphries application is a continuation-in-part of application Ser. No. 132,017 filed Apr. 7, 1971, now U.S. Pat. No. 3,687,798, and a divisional application entitled "Process for Laminating Phosphate Coated Steel with ABS Resin" Ser. No. 247,390 filed Apr. 25, 1972 which is a division of application Ser. No. 854,721 filed Sept. 2, 1969, and now abandoned.

BACKGROUND OF THE INVENTION

This invention relates to metal fiber reinforced plastic composites and more particularly to corrosion resistant metal reinforced plastic composites having improved external and internal corrosion resistance.

Steel fiber reinforced plastic composites are very attractive technically and economically. The plastic provides lightness not attainable with metallic sheets while the fiber reinforcing provides strength unattainable with plastic alone, and greater stiffness than can be attained with glass or aluminum fiber reinforcing. If the steel fiber is in the form of very thin relatively short wires having, for example, the consistency of chopped steel wool, the steel reinforced plastic composite may be extruded or otherwise shaped by normal plastic forming machinery and the finished composite pieces may be cut to shape with ordinary hand or power woodworking tools. When the plastic is cut or abraded, however, the ferrous metal is exposed and tends to quickly oxidize causing unsightly and detrimental rust areas along the cut section of the composite.

In addition to the surface corrosion which may occur at the surface of a cut or abraded section of ferrous fiber reinforced plastic, if the plastic matrix is not intimately adhered to the metallic reinforcing fibers, corrosive action may migrate along the surfaces of the metal fibers into the interior of the plastic composite with possible deleterious effects to the plastic matrix.

Styrene polymer resins and acrylo-nitrile-butadiene-styrene (ABS) type resins have been found to be particularly useful in making metal fiber reinforced plastic composites because of their properties and economy.

Styrene polymer resins used for extrusion or injection molding are commonly formulated from reactor flake resin. Additives are generally included to promote stability and processability. A lubricating agent is usually added to the moldable grades of styrene polymers to permit easy release of the polymer from molds or dies. Particularly useful lubricants are certain metallic soaps. While a lubricant, or release agent, is usually necessary for efficient molding of a styrene polymer, the presence of the lubricant in the resin reduces the adhesion of the resin to metal reinforcements or substrates, such as steel wire or sheets.

In order to overcome the effect of the lubricant on the bonding of a styrene polymer sheet to a metal sheet, other synthetic resins, for example, epoxies and modified epoxies, are often used as a laminate between the resin and metal to promote adhesion. With epoxies, some application problems may develop, due to high viscosity and limited pot life. Also, epoxies are relatively expensive. Furthermore, molding or extrusion of the resin during processing tends to wipe the epoxy adhesive layer from the metal surface and a poor bond results.

While ferrous fiber reinforced plastic composites have been found to have many desirable features in comparison with plastics reinforced with other types of fibers such as for example glass reinforcing fibers, one disadvantage which has been experienced in both glass fiber reinforced plastics and metal fiber reinforced plastics has been an inability to attain a smooth defect-free molded surface. The fiberglass or metal reinforcing fibers tend during molding, stamping or extrusion to be left exposed upon the surface of the plastic part causing a rough surface which occasionally has pits in it and/or the ends of the reinforcing fibers sticking through the surface.

While various methods of mixing and forming feed materials for the making of metallic fiber reinforced plastic composites have been tried in the past no really satisfactory method of producing such composites has been developed.

SUMMARY OF THE INVENTION

The foregoing corrosion difficulties have been alleviated in accordance with the present invention by thoroughly cleaning thin ferrous and thin sacrificial metal wires such as, for example, zinc wires in the form of steel or zinc wool or other comparable sized thin wires or strands, coating said ferrous and preferably also sacrificial metal wires with a fused film of acrylonitrile-butadiene-styrene resin applied from a solution of the resin in an organic solvent, combining the ferrous and sacrificial metal fibers together in a desired ratio effective to retard surface corrosion of any cut ends or exposed portions of the ferrous fibers at a cut surface of a subsequently produced plastic composite, forming a strand of such ferrous and sacrificial metal wires either prior to or subsequent to combining of the fibers, extruding a predetermined amount of a styrene base plastic resin such as polystyrene or acrylonitrile-butadiene-styrene over the said strand as an outer plastic sheath and chopping the plastic sheathed strand into pellets suitable for use as a feed material for a subsequent plastic forming operation at elevated temperatures wherein the heat is preferably derived at least in part from induced electrical currents within the ferrous fibers within the pellets. In some cases the sacrificial metal fibers may be omitted.

By operating in accordance with the present invention there can be economically and practically produced a plastic composite with metallic fiber reinforcement which is corrosion resistant both internally and externally along cut or abraded surfaces and which has smooth mirror-like surface finishes upon its final molded plastic surfaces.

DESCRIPTION OF THE PREFERRED EMBODIMENTS

Figure 1:
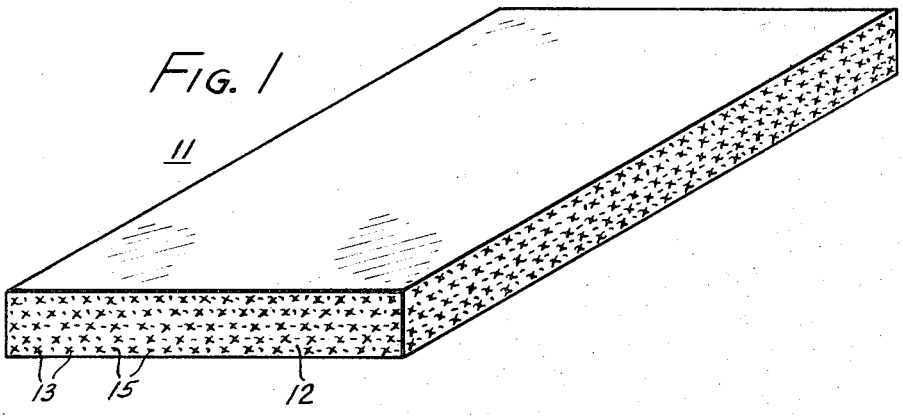
FIG. 1 is an isometric view of a corrosion resistant plastic sheet fabricated made according to the present invention.

In FIG. 1 there is seen a thermoplastic composite sheet 11 molded from ABS or styrene resin 12 with ferrous fibers 13 disposed evenly throughout in the form of steel wool fibers interspersed with fibers of zinc wool 15. The relative percentages, distribution and compaction of the ferrous fibers 13 and zinc fibers 15 are such that no ferrous fiber 13 is spaced significantly more than one eight of an inch from the nearest adjoining zinc fiber 15 and the ferrous fibers are in at least occasional effective electrical contact with the zinc fibers throughout the composite. The steel wool and zinc wool may be applied in separate but closely adjacent layers but are preferably mixed together prior to placing in the plastic matrix of the composite. Desirably, the steel wool and zinc wool may be manufactured together in a suitable ratio to provide a single bundle of ferrous and zinc fibers ready for use. The mixture of ferrous and zinc fibers can be either in the form of a loose mat or dry blend of short chopped ferrous and zinc fibers.

The ferrous fibers 13 and preferably also the zinc fibers 15 are intimately and adherently bonded to the matrix resin 12 by the interposition between the matrix and the fibers of a fused coating of ABS resin which is adherent to both the surface of the fibers — which preferably also have a phosphate coating upon their surfaces — and the resin of the matrix. This intimate bonding between the plastic matrix and the metal fiber prevents the migration of moisture and other corrosion inducing agents from a cut or abraded surface of the plastic composite where the metal fibers are exposed along the surface of the fiber into the interior of the plastic composite where it could seriously weaken as well as discolor the plastic composite.

The bonding of the plastic matrix to the reinforcing fibers attained by the use of the ABS bonding system of the present invention, in addition to providing internal corrosion protection, also enables plastic articles to be molded or otherwise hot shaped from the plastic composite material with smooth defect free and often mirror-like surfaces. The bonding of the plastic matrix to the metal reinforcing fibers is so secure even at molding temperatures that the fibers are prevented from being drawn from the surface of the hot molded part by contact with the molding surfaces even while the resin material is in a plastic state during molding and it will be found that there is invariably a thin surface wash or film of plastic deposited over the surface or ends of any metal fibers near the surface of the molded part, which thin layer or film, after the plastic resin matrix has hardened or set, confers a mirror-like finish to the surface of the part (assuming of course that the mold surface is perfectly smooth). No metal fibers will be found protruding from the surface of the resulting plastic molded part.

It is not as important for the zinc or other sacrificial metal fibers to be intimately adhered to the plastic of the matrix of the plastic composite since the zinc fibers are not as corrodible as the ferrous fibers. However, it is much preferable for the zinc fibers to also be bonded to the matrix plastic by an interposed layer of fused ABS resin as this eliminates such internal corrosion as may occur on the zinc and also increases the overall strength and mechanical properties of the plastic composite to a significant degree by increasing the reinforcing effect of the zinc fibers upon the plastic composite as a whole. If a smooth mirror-like surface is desired upon the final molded plastic composite part the zinc fibers must also be bonded according to the present invention else they will tend to protrude slightly from the surface of the final molded part destroying the smoothness of the surface and often leaving defects upon the surface.

Figure 2:
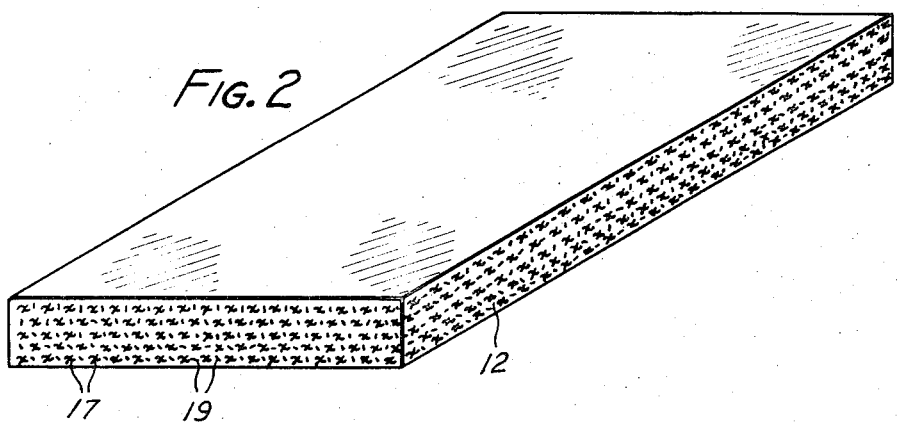
FIG. 2 is an isometric view of a second embodiment of the plastic composite made in accordance with the present invention.

In an alternative embodiment shown in FIG. 2, coated ferrous fibers 17 in wool form and zinc fibers 19 in wool form are interspersed in a plastic matrix. The coating on ferrous fibers 17 is a non-ferrous sacrificial or non-sacrificial metal. The article composition is similar to FIG. 1, in which 12 is a thermoplastic styrene ABS resin and in which the fibers are dispersed in a manner similar to that previously described for FIG. 1 and are adhered to the plastic matrix by an interposed thin layer of ABS resin.

Figure 3:
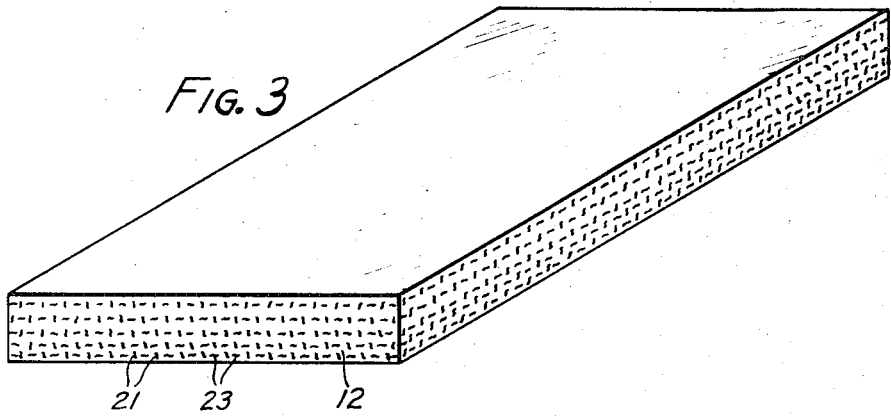
FIG. 3 is an isometric view of a still further embodiment of the plastic composite made in accordance with this invention.

In the alternate embodiment shown in FIG. 3, ferrous fibers 21 and also ferrous fibers 23 which are coated with a sacrificial metal, e.g. zinc, are interspersed in a plastic matrix. The article composition is similar to FIG. 2 in which 12 is a thermoplastic resin such as styrene or ABS and in which the fibers are dispersed and adhered to in a manner similar to that previously described for FIG. 2.

Figure 4:
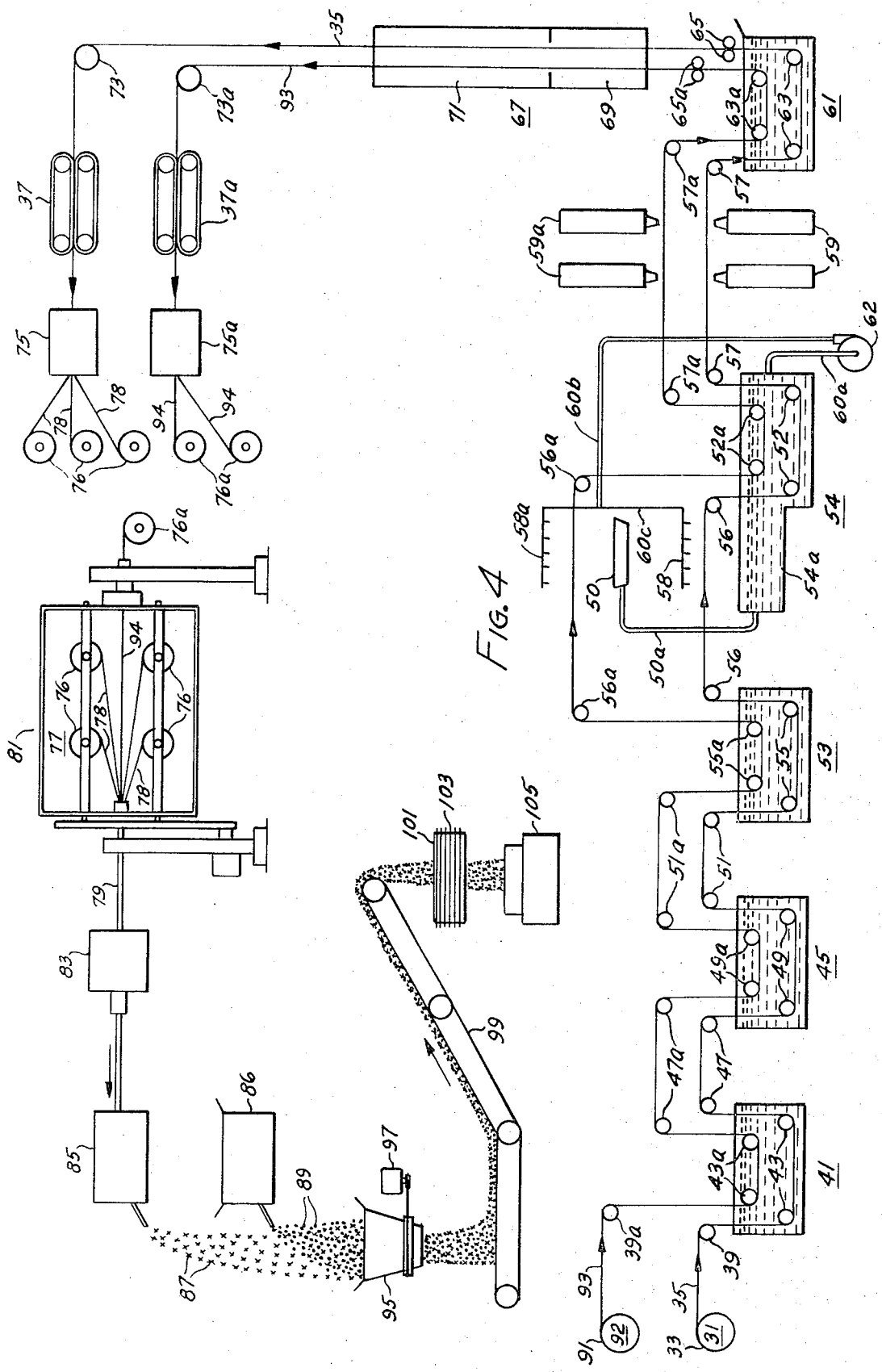
FIG. 4 is a diagrammatic view of a plastic fabrication line suitable for making plastic composites according to the present invention.

In FIG. 4 there is schematically depicted a production line suitable for making the plastic composite of the present invention. In FIG. 4 a reel 31 has a coil 33 of steel wool fibers or steel wool matting 35 coiled upon it. The steel wool fiber or matting 35 is pulled through apparatus succeeding the reel 31 by a cata-puller type capstan 37 near the end of the line. The steel wool fibers 35 pass from the reel 31 over a guide roller 39 and down into a cleaning tank 41 where the steel wool passes about a pair of sinker rolls 43 and up out of the tank 41 to a rinse tank 45. Any suitable type of alkali cleaner is contained in the cleaning tank 41 which will thoroughly clean all grease and dirt from the surface of the ferrous metal fibers comprising the steel wool matting. A pair of guide rollers 47 serve to guide the steel wool fibers 35 from the cleaning tank 41 to the rinse tank 45 and down under sinker rolls 49 in the rinse tank 45. Rinse tank 45 has an aqueous rinse solution therein such as, forexample, water to rinse the cleaning solution from the metal fibers of the steel wool. From the rinse tank 45 the steel wool passes to and over guide rollers 51 to a phosphating tank 53 where a commercial phosphate solution contacts the metal fibers and deposits a coating of phosphate upon the metal fibers as they pass about sinker rolls 55. From the phosphating tank 53 the steel wool fibers pass about guide rolls 56 to a second rinse tank 54 where the steel wool matting or fibers 35 pass down around sinker roll 52 before passing up and over guide rolls 57 between which the rinsed phosphated metal fibers are subjected to hot air blasts from hot air nozzles 59 which direct a blast of hot air at and past the metal fibers to thoroughly dry the phosphate solution upon the fibers. As the steel wool fibers 35 pass over guide rollers 56 they are subjected to rinse sprays from headers 58 which are supplied with rinse solution from the rinse tank 54 through feed lines 60a, 60b and 60c and pump 62. The solution from headers 58 drains into a shallow end 54a of the rinse tank 54.

After passing by hot air nozzles 59 the metal fibers 35 pass down into an ABS application tank 61 where the fibers are contacted by a solution of ABS resin. The resin solution may be made by dissolving reactor flake grade ABS resin in three parts of diacetone alcohol and 1 part xylene. The resin will preferably represent at least about 10 percent by weight of the solution. The steel fibers 35 pass about sinker rolls 63 in the ABS application tank 61 and then out of the tank through squeegee metering rollers 65, which press excess ABS plastic solution from the metallic fibers, to a heating furnace 67. Heating furnace 67 is comprised of two sections 69 and 71. Section 69 is a drying or solvent flashing section where solvent remaining from tank 61 is flash evaporated from the metallic fibers. Section 71 of furnace 67 is a fusing section where the ABS resin deposited from the solution in tank 61 is fused upon the surface of the metal fibers over the top of the prior applied phosphate coating.

After the metal fibers of the steel wool exit from fusing section 71 of heating furnace 67 the metal fibers pass over guide roll 73 and then through catapuller 37 which directs the matting of steel wool fibers into a commercial type slitter 75 which slits the matting into two or three parallel sections or strips 78 which are then reeled upon reels 76 in preparation for twisting in twisting apparatus 77 which twists the flat strips 78 of steel wool matting which have been slit from the single mat 35 into a twisted strand 79 of steel wool having all the individual fibers coated with a thin layer of fused ABS resin. The reels 76 are transferred into the flyer 81 of the twister 77 as needed. The steel wool strips from reels 76 are combined in the twisting apparatus 77 with at least one zinc wool strip 94 coiled upon reels 76a. As will be explained below the zinc wool fibers 93 are preferably first passed through the same coating apparatus as the steel to obtain a fused ABS resin film on the zinc fibers. The strand 79 of steel wool matting and zinc matting is then passed through an extruder 83 where a coating of ABS resin or styrene resin is placed over the surface of the twisted strand of steel wool and zinc fibers. The coated twisted strand 79 of steel wool and zinc fibers is then passed to a commercial type chopping apparatus 85 which chops or severs the coated strand into short lengths or pellets 87 of ABS coated fibers having an external jacket of styrene or ABS resin thereover. The amount of resin in the extruded jacket is preferably calculated to be exactly sufficient to form a plastic matrix with the included metal fibers when the pellets are heated.

The pellets 87 may be dropped directly from chopper 85 to a rotating mixing hopper or blender 95 where they are blended, if necessary, with pellets 89 of ABS or polystyrene resin from hopper and measuring apparatus 86 to increase the percentage of matrix plastic in the final molded product. If no additional plastic is needed no pellets of pure plastic resin will be supplied by the hopper and measuring apparatus 86.

The zinc or other sacrificial metal fibers 93 which are blended in the form of strips 94 with the ferrous fibers in the form of strips 78 in the twisting apparatus 77 are derived in basically the same manner as described above with respect to the ferrous fibers from a coil of zinc wool matting 91 on reel 92. Zinc wool fibers or matting 93 then pass through the same coating tanks 41, 45, 53, 54 and 61 and over guide and sinker rolls all appropriately numbered with the same numerical designations as the guide and sinker rolls over which the steel wool passes but, in each case, with the letter designation "a" appended thereto, and then through the same heating furnace 67 and identical slitting apparatus 75a after which the strips 94 of zinc wool matting are reeled upon reels 76a. A drain pan 50 and drain 50a are located above the rinse tank 54 to catch the drainage from rinse headers 58a.

Blender 95 is rotated by motor 97. From the blender 95 the mixed pellets may be deposited upon metering belt or web 99 which drops the pellets at a controlled rate into an induction furnace 101 having induction coils 103 thereabout. The induction furnace 101 heats the pellets 87 and 89 by induction heating of the ferrous fibers in the pellets 87 which in turn heat the surrounding plastic and the adjacent zinc fibers without detrimental degradation of the plastic material. After a batch of pellets are heated to the correct temperature in the induction furnace 101 the heated plastic may be transferred in any suitable manner to a press apparatus 105 where the sheets shown in FIG. 1 may be formed. In FIG. 4 the heated pellets are shown being discharged from the bottom of the induction coil 101 directly into the press 105. Such discharge would, of course, be periodic. It will readily be understood that the press apparatus 105 can be replaced by an extrusion apparatus, a die stamping apparatus, injection molding apparatus or any other plastic forming apparatus.

It will be understood that other methods of blending the ferrous fibers and the zinc fibers can be adapted. It is, of course, very advantageous to use a metal wool having both zinc and steel fibers initially woven into a single mat or collection of fibers. In this case only one metal wool matting need be passed through the various coating apparatus and chopped into pellets near the end of the line. In a like manner all of the ferrous fibers could initially be coated with a sacrificial metal such as zinc so that only one matting need be treated and coated. If surface corrosion of the plastic composite, furthermore, is not a serious drawback in the particular application for which the plastic composite is to be used the entire operation of preparing sacrificial metal pellets may be eliminated and the ferrous fibers merely treated with the ABS resin coating in order to attain the desired intimate bond with the plastic of the matrix. In this case all the molded or hot formed surfaces of the final plastic composite will be smooth and mirror-like due to the absence of metallic reinforcing fibers protruding from or lying at the molded surface of the composite, assuming, of course, that the plastic contacting surfaces of the hot molding apparatus have a smooth mirror-like surface finish.

It will also be understood that various changes in the sequence of some of the coating and other operations may be had. Thus in many cases it may be highly desirable to slit the steel wool and/or zinc wool initially and twist it into strands of metal fibers prior to coating the metal fibers with the phosphate and ABS coatings. Various other changes in the sequence of operations can also be made particularly with regard to the time and location of blending the sacrificial metal fibers or metal fibers coated with sacrificial metals with the ferrous fibers.

Separate coated pellets of ferrous fibers and zinc fibers may also be produced by chopping separate twisted strands of both types after extrusion coating with ABS or styrene plastic and the separate pellets blended together in blender 95 which may have special blending blades or the like therein. It is, of course, rather difficult to obtain a uniform blend in this manner.

It may also often be advantageous to phosphate treat the metal fibers in a hydrocarbon solvent rather than an aqueous solvent to eliminate rusting. For example the so-called "Triclene" phosphatizing procedure produced by E. I. duPont de Nemours & Co., Inc. may be used with advantage. In this system the metal fibers are both cleaned and phosphated in a trichloroethylene solvent. It has been found that any steel fiber used to reinforce the plastic composite should preferably have a maximum diameter of about 0.002 to 0.003 inches.

In one particular example of the method of preparing plastic and fiber feed pellets for forming plastic composites the ferrous metal reinforcing fibers were treated as follows. The zinc fibers would be, of course, also treated in substantially the same manner and may in some cases be preferably treated simultaneously as an integral part of the steel fiber matting where it is convenient and economical to preblend long fibers of ferrous metal and zinc together in a single matting. This can be done economically at present only where a rather large tonnage of the fibers are to be prepared and used.

The starting material used was 4 inch wide steel wool ribbon, so called Brillo "0" grade received in five pound coiled rolls. The ribbon weighed approximately 9.75 grams per square foot or 2.14 pounds per 100 feet. The steel wool fibers were approximately .0025 inches in diameter.

The ferrous wool fiber ribbon was first alkaline cleaned in so-called "Ridoline 53" produced by American Chemical Products, Incorporated, with 1250 to 1500 grams of Ridoline in 100 liters of water at 180° F. The metal fibers were contacted with the alkaline cleaner solution for 1 to 3 minutes. The steel wool ribbon was then rinsed with a cold water spray as well as by immersion in cold water.

The metal wool was then phosphate coated in a solution of so-called "Granodine 1101A" produced by American Chemical Products Incorporated. 18.25 liters of the phosphate crystals per 100 liters of water and 66.6 grams of sodium hydroxide per 100 liters of water were used at a bath temperature of 160° to 180° Fahrenheit. Immersion time was 30 to 45 seconds followed by a phosphate solution rinse (secured by siphoning off clear phosphate solution near the top of the tank and spraying it upon the emerging steel wool to wash off any large pieces of precipitated phosphate.) The approximate coating weight of the resulting phosphate coating was 60 to 80 milligrams per square foot.

The phosphate coating was next subjected to a cold water spray rinsing and then to a compressed air drying followed by forced hot air drying.

The phosphate coated steel wool was then dip coated into a solution containing 100 grams per liter of Marbon ABS 23614 flake ABS resin No. 23614 produced by the Marbon Chemical Division of Borg-Warner Inc., in a 1 to 3 mixture of xylene and diacetone alcohol. Immersion time was 30 to 60 seconds.

The steel wool was then subjected to a two stage heating in a radiantly heated oven. The first stage was a solvent evaporation and removal stage at an oven air temperature of 165° F. for approximately 2.5 minutes with the vapors directed through a fan blower.

The second stage was a plastic fusion bonding stage at an oven air temperature of 435° to 450° Fahrenheit for 3.5 minutes. It has been found that the product must be maintained at 400° Fahrenheit or higher for a minimum of two minutes. The fused ABS coated ferrous metal fibers were then sheared into desired lengths or slit into strands which were later twisted into strands. These strands were then extrusion coated with a high impact extrusion grade of ABS resin using enough resin to provide the desired percentage of resin to metal fibers of about 15 to 40 percent metal fibers per weight of plastic. About 20 to 30 percent metal to plastic is preferred. The finished coated strand was then chopped into pellets of the desired size which could be used as the feed for any suitable type of plastics forming apparatus such as an extruder, molding press or the like.

In one example of an alternative procedure the fused ABS coated fibers were chopped into short lengths and then added to a sufficient quantity of plastic ABS pellets in a so-called "Mixtruder" made by the J. H. Day Company having 180° spiral agitator blades, a 15 horse power agitator drive and a 10 hp extrusion screw drive with proper jacketing for heating to 500° Fahrenheit. The plastic ABS resin or styrene resin pellets were added, preheated to 400° F. in the Mixtruder and when fully plasticized the fused ABS coated fibers were added to the Mixtruder in proper proportions and mixed for 12 to 15 minutes at the end of which extrusion was started through the heated die of the Mixtruder. The extrusion die orifice could be set to provide an extrudate, for example a 2 inch rod or a 1 inch times 1 inch bar which could then be cut into any desired lengths for further processing.

Uniform mixes can also be easily prepared by mixing the proper proportions of chopped fused ABS coated metallic wool fibers, or ribbons together with dry granules of the desired resin in a high speed blender of any suitable type, such as a blender having a propeller type mixing element, and then pouring the uniform dry blend into suitable molds which are subsequently heated to fuse the plastic into a matrix for the metallic fibers. The molds may be subjected to compression during or subsequent to heating to improve the density of the composite.

Alternatively, blending of the fibers and/or the fibers and the plastic may be separate or combined with molding of the composite in, for example, injection molding, extrusion forming or other plastic composite forming processes well known in the art.

As used herein, a sacrificial metal and sacrificial metal coating means a metal or a metal coating having a greater electronegativity than iron. A non-sacrificial metal and a non-sacrificial metal coating would be a metal or metal coating having an electronegativity equal to or less than that of iron. In addition, the term ferrous fibers is meant to include a ferrous alloy fiber wherein iron is the predominant element.

While zinc is the preferable galvanic metal, the broad invention is not limited to the use of zinc, but encompasses the use of other sacrificial metals and alloys, and sacrificial metal composites having at least one metal constituent with a greater electro negativity than iron. Zinc and zinc alloys are, however, the preeminent materials for this purpose.

It has been found that the ABS resin adhesive, fused to the metal substrate, meets the requirements of a practical adhesive primer for the lamination of metal fibers with an ABS or styrene resin outer layer, whereas other resins, including other styrene types, will not. The ABS adhesive, besides being a low cost material, is applied readily to the metal substrate. In the fused condition, it will not wipe off during application of the ABS resin outer layer, either during a molding or an extrusion step. The non-wiping feature is of utmost importance in producing a laminate by extrusion. Additionally, the complete compatibility of ABS resin adhesive with the ABS resin or styrene resin matrix aids in a proper bonding of the two layers, even though the moldable or extrudable outer layer of resin contains the typical metallic soap type lubricant, added to aid in release from the metal mold.

In applying the adhesive primer to the substrate in the form of a solution, flake grade ABS resin is preferred, merely because of ease of handling and availability. However, any grade of ABS resin may be used, provided that it is virgin material and is relatively free from deleterious additions.

While numerous organic solvents are available for the formation of the adhesive solution of ABS resin such as esters and chlorinated hydrocarbons, ketones are found to be most satisfactory. A compound such as xylene may be added to the ketone in a quantity sufficient to prevent too rapid drying. Too rapid evaporation of the solvent could result in uneven distribution of the resin on the substrate.

The concentration of the primer solution is not critical except that it must contain sufficient resin to produce a dry film thickness which will adhere to the steel. There is no upper limit for concentration as long as the solution is sufficiently fluid to be applied to the steel surface uniformly. With a 10% by weight solution of resin, the dry film thickness on the steel sheet produced by a single pass through the coating apparatus is about 0.0002 inch. The primer solution may be applied to the metal fiber by either roller coating or immersion, or by spraying.

In fusing the ABS resin primer to the metal fiber substrate, the required temperature will generally be between about 230° and 400° F., the higher temperature being preferred because of the more rapid processing resulting therefrom. A time of from 1 to 3 minutes is usually preferred.

The temperature required for the laminating of the resin to the adhesive primed metal surface will also range, preferably, between 300° and 400° F. Sufficient heat must be applied to raise the temperature of the metal fiber substrate to the fusion temperature of the resin and to effect fusion of both the primer and the matrix resin surface in contact with the primer. Temperatures much above 400° F. are undesirable, since the resin may be thermally degraded and/or the phosphate coating decomposed. Induction heating is considered the most suitable for the fusing and molding operations, but other methods, such as hot air heating have been used. ABS resins as commonly known can include terpolymers, graft polymers, block polymers or mixtures, singly or together and concentrations of each component may vary rather widely as long as all three components i.e. acrylonitrile, butadiene and styrene, are present. All resins meeting the art recognized definition of an ABS resin, that is an acrylonitrile-butadiene-styrene system whose physical properties include rigidity, will work. This definition, however, excludes elastomers such as nitrile rubbers, even though the latter may contain some of the same elements as an ABS resin. Likewise the designation of a styrene base or type polymer is intended to refer to any type of styrene polymer where styrene is a major portion of the polymer.

We claim:

1. A method of making a plastic composite having a smooth defect free surface comprising:
   a. passing a linearly extending collection of ferrous fibers through a cleaning operation and a phosphating operation;
   b. passing the linearly extending collection of ferrous fibers through a solution of acrylonitrile-butadiene-styrene in an organic solvent;
   c. passing the linearly extending collection of ferrous fibers through heating means to evaporate the organic solvent and fuse the acrylonitrile-butadiene-styrene to the surface of the ferrous fibers;
   d. extruding a sheath of a styrene base polymer about the exterior of the linearly extending collection of ferrous fibers;
   e. chopping the linearly extending ferrous fibers together with the plastic coatings about said ferrous fibers into pellets;
   f. heating and blending the pellets to form a uniform mix of matrix plastic and reinforcing ferrous fibers; and
   g. forming the heated plastic by heated plastic forming apparatus into a desired shape having smooth external molded surfaces.

2. A method of making a plastic composite according to claim 1 wherein the styrene base resin sheath which forms the matrix plastic is selected from the group consisting of polystyrene and acrylonitrile-butadiene-styrene.

3. A method of making a corrosion resistant plastic composite having a smooth defect free surface comprising:
   a. coating a plurality of ferrous metal fibers with a surface film of acrylonitrile-butadiene-styrene resin dissolved in an organic solvent and heating the coated fibers to expel the solvent and fuse the remaining film of resin to the surface of the fibers,
   b. uniformly combining said coated ferrous fibers with a predetermined quantity of a styrene base plastic from the group consisting of polystyrene and acrylonitrile-butadiene-styrene in a manner such that short lengths of the ferrous fibers are encapsulated within the plastic to form ferrous fiber containing plastic pellets,
   c. combining said pellets of (b) with additional styrene base plastic pellets without included fibers and uniformly blending both sets of plastic pellets together, d. heating said plastic pellets and included ferrous fibers to an elevated temperature, and e. forming the plastic and included ferrous fibers uniformly distributed throughout the plastic into a desired predetermined shape by a hot shaping operation.

4. A method of producing a corrosion resistant plastic composite according to claim 3 wherein a plurality of sacrificial metal fibers are treated as in step (a) and uniformly combined with a styrene base plastic as in step (b) together with the ferrous fibers and thereafter treated as in steps (c) and (d) with the plastic pellets and ferrous fibers containing plastic pellets to form a ferrous fiber reinforced plastic composite with included sacrificial metal fibers.

5. A method of making a corrosion resistant plastic composite comprising:
   a. coating a series of ferrous metal fibers with a surface film of fused acrylonitrile-butadiene-styrene resin;
   b. coating a series of sacrificial metal fibers having a greater electro negativity than iron with a surface film of fused acrylonitrile-butadiene-styrene resin;
   c. combining the ferrous and sacrificial metal fibers into a strand of metallic fibers;
   d. extruding a sheath of a styrene base plastic over the surface of the metallic fibers;
   e. severing the plastic sheathed strand into a series of short pellets;
   f. heating the plastic sheathed pellets; and
   g. forming the heated plastic and included fibers into a desired shape by a molding operation at an elevated temperature.

6. A method of making a plastic composite according to claim 5 wherein the plastic sheathed pellets are heated in step (f) by electrical currents in the ferrous fibers induced by induction coil means.

7. A method of making a plastic composite according to claim 5 wherein the plastic sheath of a styrene base plastic is extruded over the ferrous and sacrificial metal fibers prior to combining the ferrous and sacrificial metal fibers together but prior to heating the plastic sheathed pellets.

8. A method of making a corrosion resistant plastic composite according to claim 7 wherein the styrene base plastic is selected from the group consisting of polystyrene and acrylonitrile-butadiene-styrene.

9. A method of making a corrosion resistant plastic composite according to claim 5 wherein the styrene base plastic which is extruded over the metal fibers is selected from the group consisting of polystyrene and acrylonitrile-butadiene-styrene.

10. A method of making a ferrous fiber reinforced plastic composite having ferrous fibers distributed uniformly throughout a plastic matrix comprising:
   a. passing a linearly extending collection of ferrous fibers through a cleaning operation,
   b. passing the linearly extending collection of ferrous fibers through a primer composed of a polymeric adhesion inducing material comprised of acrylonitrile-butadiene-styrene in an organic solvent,
   c. passing the linearly extending collection of ferrous fibers through heating means to evaporate the organic solvent and fuse a thin layer of the polymeric material upon the surface of the ferrous fibers,
   d. extruding a sheath of a thermoplastic polymer comprising a styrene base plastic compatible with the polymeric film upon the surface of the ferrous fibers about the exterior of the linearly extending collection of ferrous fibers,
   e. chopping the linearly extending ferrous fibers together with the extruded plastic coatings about said ferrous fibers into pellets,
   f. heating and blending the pellets to form a uniform mix of matrix plastic and reinforcing fibers, and
   g. forming the heated plastic by heated plastic forming apparatus into a desired shape having smooth external molded surfaces.

11. A method of making a ferrous fiber reinforced plastic composite according to claim 10 wherein linearly extending sacrificial metal fibers are treated as in steps (a) through (e) and the pellets containing said sacrificial metal fibers are heated and blended in step (f) with the ferrous fiber containing pellets in order to make a corrosion resistant plastic composite.

12. A method of making a ferrous fiber reinforced plastic composite according to claim 10 wherein additional plastic pellets of the same composition as the plastic pellets of step (e) but without included ferrous fibers are combined in step (f) with the pellets containing ferrous fibers and are heated and blended in step (f) with the ferrous fiber containing pellets to form a uniform mix of plastic and ferrous fibers.

13. A method of making a ferrous fiber reinforced plastic composite according to claim 12 wherein linearly extending sacrificial metal fibers are treated as in steps (a) through (e) and the resulting pellets containing said sacrificial metal fibers are heated and blended in step (f) with the plastic pellets and ferrous fiber containing plastic pellets in order to make a corrosion resistant plastic composite.

* * * * *